US006819755B2

(12) United States Patent
Stumer et al.

(10) Patent No.: US 6,819,755 B2
(45) Date of Patent: *Nov. 16, 2004

(54) METHODS AND APPARATUS FOR CONTROLLING CALL HANDLING IN A COMMUNICATIONS NETWORK

(75) Inventors: Peggy M. Stumer, Boca Raton, FL (US); Eugene A. Wodka, Wellington, FL (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 441 days.

This patent is subject to a terminal disclaimer.

(21) Appl. No.: 09/849,550

(22) Filed: May 4, 2001

(65) Prior Publication Data

US 2002/0164010 A1 Nov. 7, 2002

(51) Int. Cl.[7] .................. H04M 1/64; H04M 3/523; H04M 11/00
(52) U.S. Cl. .............. 379/265.02; 379/88.04; 379/88.18; 379/188
(58) Field of Search ........... 379/265.02, 266.01, 379/215.01, 211.01, 211.02, 386, 188, 309, 88.04, 88.18; 370/352, 356, 261

(56) References Cited

U.S. PATENT DOCUMENTS

| | | | | |
|---|---|---|---|---|
| 5,265,157 A | * | 11/1993 | Jolissaint et al. | 379/386 |
| 5,333,133 A | * | 7/1994 | Andrews et al. | 370/261 |
| 5,444,774 A | * | 8/1995 | Friedes | 379/266.01 |
| 5,566,234 A | * | 10/1996 | Reed et al. | 379/188 |
| 5,963,635 A | * | 10/1999 | Szlam et al. | 379/309 |
| 5,970,134 A | * | 10/1999 | Highland et al. | 379/265.02 |
| 6,014,436 A | * | 1/2000 | Florence et al. | 379/211.01 |
| 6,044,144 A | * | 3/2000 | Becker et al. | 379/265.02 |
| 6,088,437 A | * | 7/2000 | Amick | 379/211.02 |
| 6,122,365 A | | 9/2000 | Yegoshin | 379/266.01 |
| 6,195,357 B1 | | 2/2001 | Polcyn | 370/401 |
| 6,195,417 B1 | | 2/2001 | Dans | 379/67.1 |
| 6,449,270 B1 | * | 9/2002 | Miloslavsky | 370/356 |
| 6,493,433 B2 | * | 12/2002 | Clabaugh et al. | 379/88.13 |
| 6,563,916 B1 | * | 5/2003 | Deutsch et al. | 379/215.01 |
| 2002/0018461 A1 | * | 2/2002 | Ma | 370/352 |
| 2002/0071541 A1 | * | 6/2002 | Cheung et al. | 379/215.01 |
| 2003/0031309 A1 | * | 2/2003 | Rupe et al. | 379/265.02 |

FOREIGN PATENT DOCUMENTS

| | | | |
|---|---|---|---|
| DE | 196 35 329 A1 | 3/1998 | H04M/3/50 |
| EP | 0 377 395 A2 | 7/1990 | H04M/3/50 |

OTHER PUBLICATIONS

European Search Report dated Mar. 26, 2004.

* cited by examiner

Primary Examiner—Harry S. Hong

(57) ABSTRACT

Methods and apparatus for controlling call handling in a communications network. The methods and apparatus include special processing and network signalling (between network communications devices) which enable a caller to complete a critical transaction, without interruption. An exemplary protocol and message encoding are disclosed.

62 Claims, 6 Drawing Sheets

FIG. 5

| FACILITY OPERATION | CODING | PINX-IVR |
|---|---|---|
| PULLBACK FLAG STATUS<br>OCTET 1<br>　　PULLBACK NOT ALLOWED<br>　　PULLBACK ALLOWED<br>　　RESERVED | <br><br>0000000<br>0000001<br>1111111 | UNCONFIRMED<br>⟶<br><br>CONFIRMED<br>⟵ |
| PULLBACK MODE<br>OCTET 2<br>　　CANNOT BE CHANGED<br>　　CAN BE CHANGED<br>　　RESERVED | <br><br>0000000<br>0000001<br>1111111 | UNCONFIRMED<br>⟶ |
| SERVICE NUMBER<br>OCTET 3<br>　　SERVICE 0<br>　　SERVICE 1...<br>　　RESERVED | <br><br>0000000<br>0000001...<br>1111111 | UNCONFIRMED<br>⟶ |

METHODS AND APPARATUS FOR CONTROLLING CALL HANDLING IN A COMMUNICATIONS NETWORK

BACKGROUND OF THE INVENTION

1. Field of the Invention

The invention relates generally to telephony and the control of calls connected over a communications network. More particularly, the invention relates to methods and apparatus for controlling call handling in a communications network in a manner that allows a caller to complete a critical transaction, without interruption.

2. Brief Description of the Prior Art

Call centers are useful and effective communication tools for many diverse industries. For example, airline and travel businesses use call centers for reservation services. Media, cable, and telephone companies use call centers for outbound promotional sales and inbound repair and other services. Other types of inbound and outbound call center capabilities are used by brokerage houses, banks, and financial institutions.

The key to managing a successful call center is maximizing available resources and agent productivity. An Automatic Call Distribution (ACD) system ensures that incoming calls are distributed evenly, so agent productivity is maintained at a high level, and inbound callers are handled efficiently.

Utilizing an ACD system it is possible to handle a high volume of incoming calls more efficiently and effectively, improving overall productivity. An ACD system can also alleviate call bottlenecks, enabling an ACD operation to be streamlined, aid operations management, and enhance a company's image by improving customer service.

An ACD system manages incoming calls by answering the calls on a "first-come, first-served" basis. Agents answer then either on a "most-idle-first" or "next-available-first" basis. This ensures that calls are evenly distributed over an answering group while maximizing agent productivity. An ACD system also allows overflow calls to be automatically directed to another call answering group whenever necessary.

ACD systems are frequently coupled with Interactive Voice Response (IVR) systems. The IVR systems prompt the caller to input (using a telephone keypad) information which is used to process the call.

For example, in a banking environment, an IVR may prompt the caller to input an account number. In a customer service environment, the IVR may offer a menu of frequently asked questions and answers.

State of the art IVR and ACD systems interact with the ACD controlling. That is, when the ACD determines that an agent is available, it pulls the call from the IVR and connects it with an agent. This can be disadvantageous if the IVR is in the process of completing a "critical transaction". A critical transaction may be defined in different ways by different system administrators. It is essentially a transaction which is preferably not interrupted by an ACD. For example, an input of account, number may be considered a critical transaction.

SUMMARY OF THE INVENTION

It is therefore an object of the invention to provide methods and apparatus in a communications network whereby critical transactions pending in an IVR will not be interrupted by an ACD.

It is also an object of the invention to provide methods and apparatus whereby an IVR may inform an ACD whether or not a transaction may be interrupted.

It is another object of the invention to provide methods and apparatus for determining whether an IVR transaction may be interrupted.

It is yet another object of the invention to provide a messaging system whereby an IVR can communicate with an ACD regarding the nature of an IVR transaction.

It is another object of the invention to provide methods and apparatus whereby the ACD may grant permissions to the IVR regarding declaring a transaction to be uninterruptible.

It is still another object of the invention to provide methods and apparatus whereby an ACD can inform an IVR of a service request based on called number and/or calling number.

In accord with these objects which will be discussed in detail below, the methods and apparatus according to one aspect of the invention include a network feature which allows an IVR server connected to an ACD server (such as a PBX, or PINX) to gain control of an ACD call that has been routed by the ACD server to the IVR over, for example, ISDN facilities employing the ISO QSIG (signaling) protocol.

As used herein, for the sake of illustration only, an exemplary ACD server includes the following general functions: routing of an incoming call to the ACD system in the ACD server, queuing an ACD call to one or more ACD Groups when agents are not available, connecting an ACD call to an announcement or music source when agents are not available, and routing an ACD call to an IVR in order for the IVR to collect information from the caller and/or to retrieve information requested by the caller. As will be appreciated by those skilled in the art, a fewer or greater number of functions may be accommodated by an ACD without limiting the scope or spirit of the invention.

Further, according to another aspect of an illustrative embodiment of the invention, the methods and apparatus contemplated herein provide the following new functions: signaling of initial call control information from the ACD server to the IVR, signaling of a request to change the status of the pull back status from the IVR to the ACD server, pulling back an ACD call from the IVR when a condition requiring pull back occurs, e.g., when an agent becomes available, allowing an ACD call to remain connected to the IVR when a condition otherwise suitable for pull back occurs. Again, as will be appreciated by those skilled in the art, a fewer or greater number of new functions may be accommodated without limiting the scope or spirit of the invention.

According to an illustrative embodiment of the invention, the initial call control information includes one or more of the following: an indication of whether pull back is allowed or not allowed, an indication whether the IVR is allowed or not allowed to change pull back status, and a service number (or service request) for the IVR to apply to the call. The service number may be based, for example, on the called number and/or the calling number.

According to the methods of an illustrative embodiment of the invention, when a call is directed to the ACD system within a ACD server, the ACD system follows the configured step commands of the selected ACD Routing Table (ART) used to process the call. The ART selected is based on the called number and/or the calling number received by the ACD server, and may also be based an the time of day and the date.

Based on the configured step commands, the caller may be queued to one or more ACD Groups when agents are not available, and the caller may be routed to announcements or music sources while waiting for an available agent. Another configurable option is to route the caller to an IVR while maintaining the caller's position in the ACD Group queues.

When a call is routed to an IVR, the IVR is informed if this particular connection is configured to be interruptible (pull back by the ACD system is allowed) or non-interruptible (pull back by the ACD system is not allowed) and whether or not the IVR is allowed to change the pull back status.

If pull back by the ACD system is allowed, and the IVR service requested by the caller is considered to be a critical service (one that should not be interrupted), the IVR (if allowed) will request the ACD system to not pull the call back. The ACD system will respond with a positive acknowledgment unless pull back has already been initiated and has been successfully completed. In the latter case, a negative acknowledgment is returned to the IVR.

Upon receiving a positive acknowledgment, the IVR can connect the caller to the critical transaction.

Upon completion of the critical transaction, the IVR can transfer the call, return the call to the ACD system for further processing, or it can indicate that the call can be disconnected.

According to a further aspect of the invention, a signaling protocol is provided for exchange of information between an ACD server and an IVR server.

According to a presently preferred embodiment of the invention, a Siemens Hicom 300 ACD may be utilized because it supports a proprietary signaling protocol (CorNet-N D-Channel protocol) between an ACD PINX and an IVR. With the signaling protocol primitives, formats and procedures described by the invention, an IVR is informed by the ACD server whether or not the ACD system can pull a call back from the IVR for immediate ACD system servicing, and whether or not the IVR is allowed to change the pull back status before initiating a critical (uninterruptible) transaction.

The IVR, if allowed, can request a change to the pull back status in order to give the customer an uninterrupted session with a critical transaction.

Similarly, if the IVR is not allowed to change the pull back status, a critical transaction should not be initiated by the IVR, or if initiated, the critical transaction should be preceded by a warning message that the transaction may be interrupted before it is completed.

The invention allows an ACD server and an IVR server to cooperate, by usage of a network signaling protocol, to provide the best possible service to an ACD caller.

The invention is applicable in a network having a plurality of interconnected servers/PINXs, and enables routing calls to an IVR server located anywhere in the network (i.e., public or private) and pulled back for other processing.

The principles of the present invention are applicable to a wide variety of different network implementations and may be implemented as a feature in any known communications server, including, but not limited to, voice services which may span public networks, private networks and interwork between public and private networks, including standard networks such as International Standards Organization (ISO), European Computer Manufacturers Association for Standardizing Information and Communication Services (ECMA), European Telecommunications Standards Institute (ETSI), integrated Services Digital Network (ISDN) Signaling (especially signaling at the "Q" reference point (QSIG) compliant ISDN, computer supported telephony applications/computer telephony interface (CSTA/CTI) network via applications programming interfaces (API), signaling over Internet Protocol (IP), and Asynchronous Transfer Mode (ATM) networks, etc.

BRIEF DESCRIPTION OF THE DRAWINGS

FIG. 5 is a simplified chart illustrating an exemplary message encoding format according to the invention.

DETAILED DESCRIPTION

Figure 1:
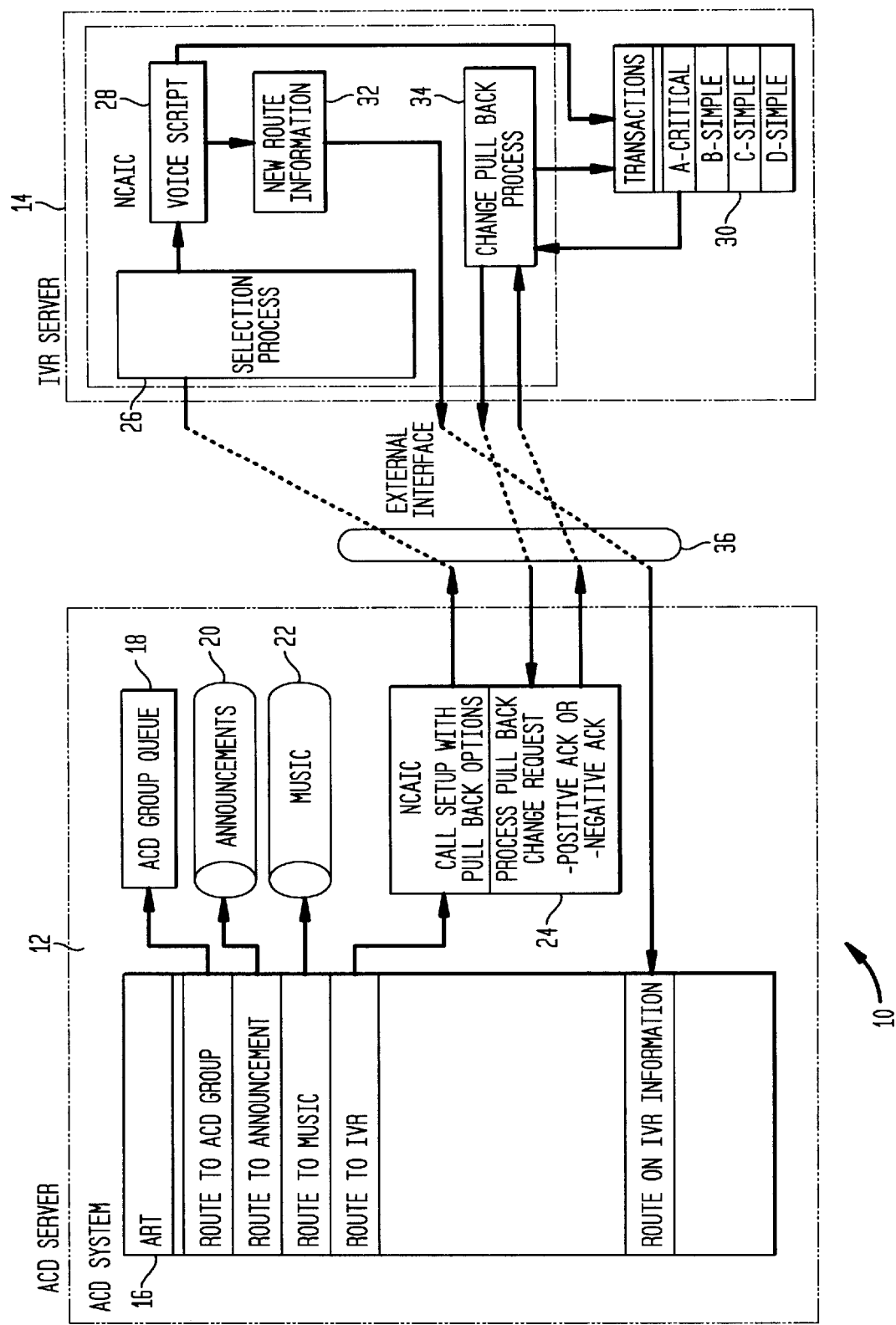
FIG. 1 is a high level block diagram of an ACD server and an IVR server configured according to the invention.

Turning now to FIG. 1, an apparatus 10 according to an illustrative embodiment of the invention includes an ACD server 12 and an IVR server 14. The ACD server 12 includes at least one ACD routing table (ART) 16, an ACD group queue 18, prerecorded announcements 20, and, optionally, a music source 22.

According to the illustrative of the invention, the ACD server 12 also includes programmed features 24 for call setup with pull back options, processing pull back change requests, and acknowledgment. The IVR server 14 includes a selection processor 26, one or more voice scripts 28, and a transaction bank 30.

According to one aspect of the invention, the IVR server may also include a new route information interface with the ART 16 of the ACD 12; and a change pull back status processor 34 which communicates with the pull back processes 24 in the ACD. The ACD and the IVR are preferably coupled to each other via an external interface 36 such as an ISO QSIG link. However, other protocols may be used.

The basic operation of illustrative apparatus 10 may be described as follows.

An incoming call to an ACD server 12 is directed to a specific route in a specific ART 16 based on the received called number, or the received called number and the calling number, and, optionally, the time of day and the date. The ART 16 may be configured to route the call to one or more ACD Group queues 18 to announcements 20, and to music sources 22 while waiting for an available agent to service the call. The ART 16 may also be configured to route the call to an IVR using the call setup with pull back options component 24 according to the invention. The call is routed to the IVR over the external interface 36.

The IVR selection processor 26 can be arranged to direct the call to a voice script 28 based on an IVR service number received from the ACD and/or may request the caller to input information from the caller' keypad. Based on the information received from the caller, the IVR may initiate a transaction 30.

According to one embodiment of the invention, based on the information received from the caller, the IVR can return the call back to ACD with new routing information 32. If a pending transaction is a critical transaction, the change pull back processor 34 determines the next course of action.

According to the illustrative embodiment of the invention being described herein, before initiating critical transaction, the change pull back processor 34 determines whether or not the ACD server 12 can pull back the call and whether or not the IVR server 14 is allowed to change the pull back status of the call. Assuming that pull back is allowed and that the IVR is allowed to change the pull back status, the change pull back processor 34 will request the ACD server 12 to change the status of the pull back option from Yes to No.

The process pull back change request feature 24 checks to see if the IVR is allowed to request a change in the pull back status. If allowed and the call has not already been pulled back, the process pull back change Request changes the pull back status to "No" and returns a positive acknowledgment to the IVR. Upon receiving the positive acknowledgment, the change pull back processor 34 in the IVR changes the pull back status to "No" and initiates critical transaction (e.g. A) in transaction bank 30. Upon completion of the critical transaction, the IVR can return the call to the ACD server for further processing or can indicate that the call can be disconnected.

If the IVR server is not allowed to change the pull back status, the process pull back change request 24 signals back to the IVR a negative acknowledgment. Critical transaction A is not started. The IVR may instead start a simple transaction (e.g. B, C, or D) that can be interrupted by a pullback from the ACD server.

The operations of the apparatus described generally above will now be described in more detail with reference to the flow charts of FIGS. 2–4.

Figure 2:
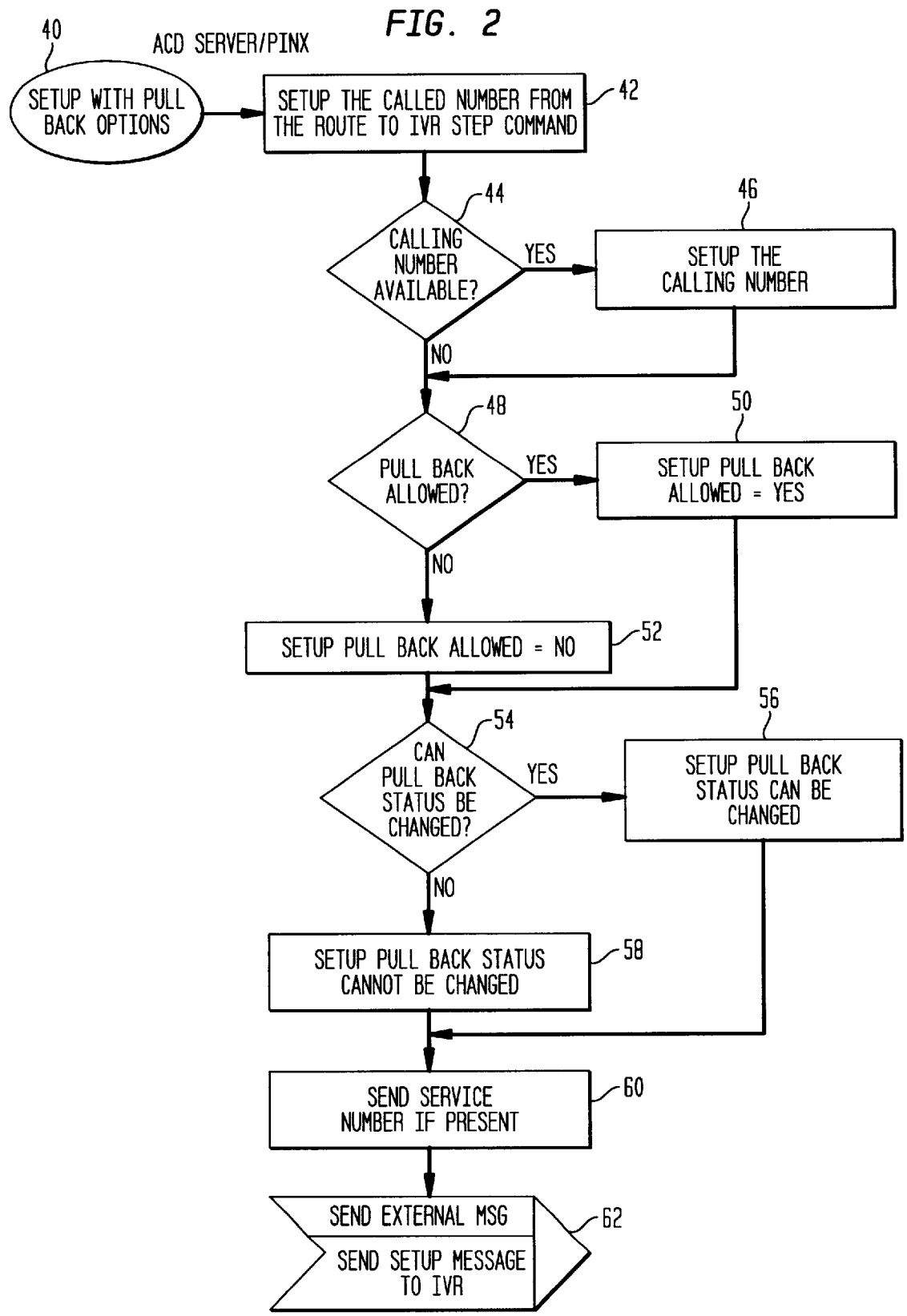
FIG. 2 is a high level flow chart illustrating call setup logic according to the invention.

FIG. 2 shows in some detail the functions at the ACD server during the call setup with pull back options. The process starts at 40. At 42, the called number is used to get the route from the ART to the IVR.

If a calling number is available (e.g. via Caller ID) at 44, the call setup may be modified at 46 using the calling number. From the information thus gathered, it is determined at 48 whether pull back is allowed.

If it is, the pull back allowed flag is set to yes at 50, otherwise it is set to no at 52. It is then determined at 54 whether the IVR server should be permitted to change the pull back status.

If it should, the pull back status can be changed flag is set to yes at 56. Otherwise it is set to no at 58. If a service number has been determined, it is sent at 60 with a SETUP message at 62 to the IVR server.

Figure 3:
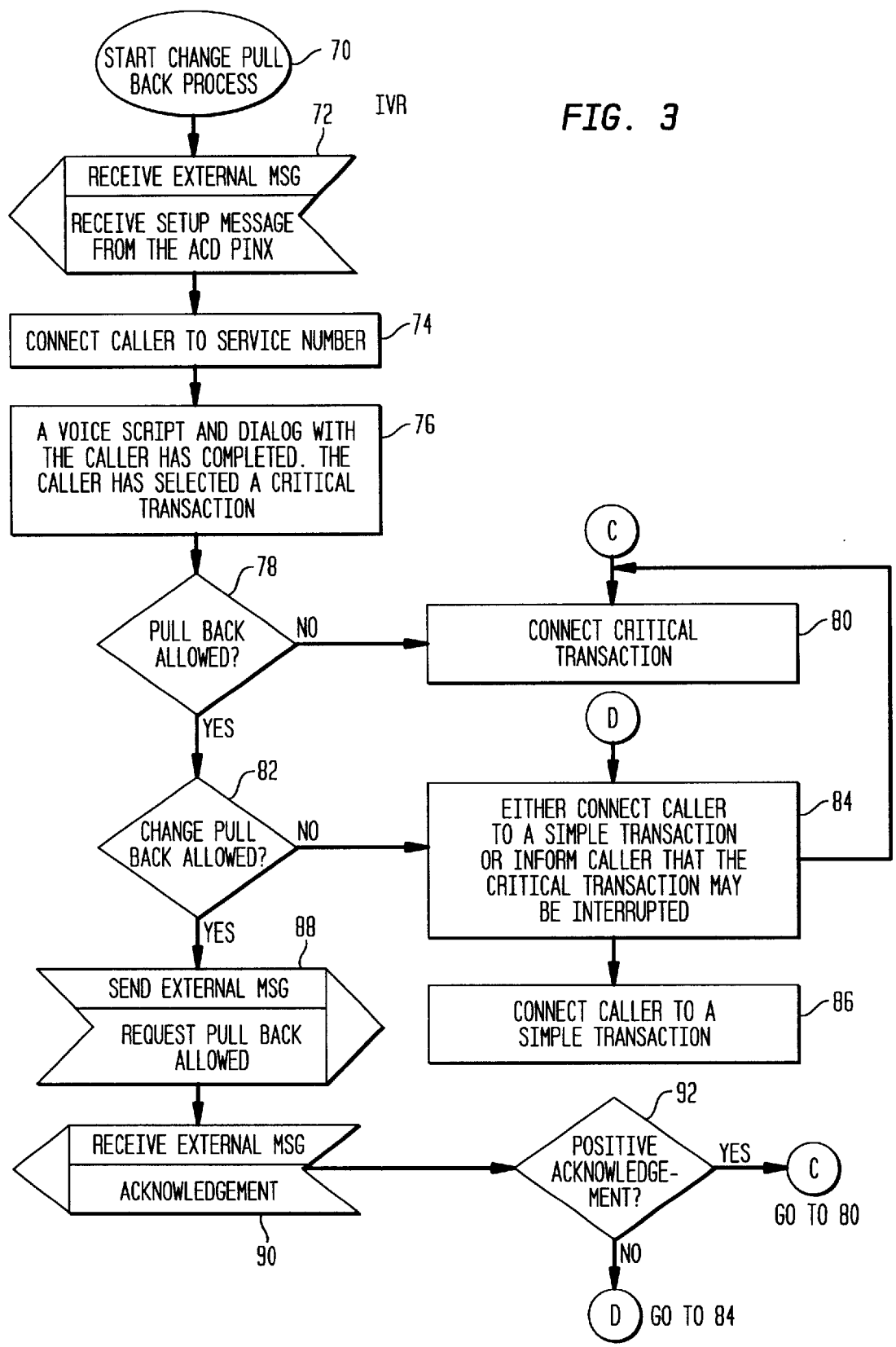
FIG. 3 is a high level flow chart illustrating the logic of an IVR change in pull back status according to the invention.

FIG. 3 shows in some detail the functions of the selection processor and change of pull back processor occurring at the IVR upon receipt of a SETUP message with pull back options. The process starts at 70 and the SETUP message from the ACD server is received at 72. The caller is connected to the service number (voice script) at 74.

In this example, the voice script and dialog with the caller result in the caller selecting a critical transaction at 76. When this occurs, it is determined at 78 whether the ACD server is allowed to pull back the call. If it is not allowed to pull back the call, the critical transaction is started at 80. If the ACD server is allowed to pull back the call, it is determined at 82 whether that can be changed by the IVR server.

If the pull back status cannot be changed by the IVR server, an option is presented at 84 to proceed with a simple transaction at 86 or to proceed with the critical transaction at 80 with the risk of being interrupted. If it is determined at 82 that the IVR can change the pull back status of the call, it sends a message at 88 to the ACD server to change the status and receives an acknowledgement at 90 from the ACD server.

If it is determined at 92 that the acknowledgement is positive, the critical transaction is begun at 80. If the acknowledgement is negative, the options at 84 are presented.

Figure 4:
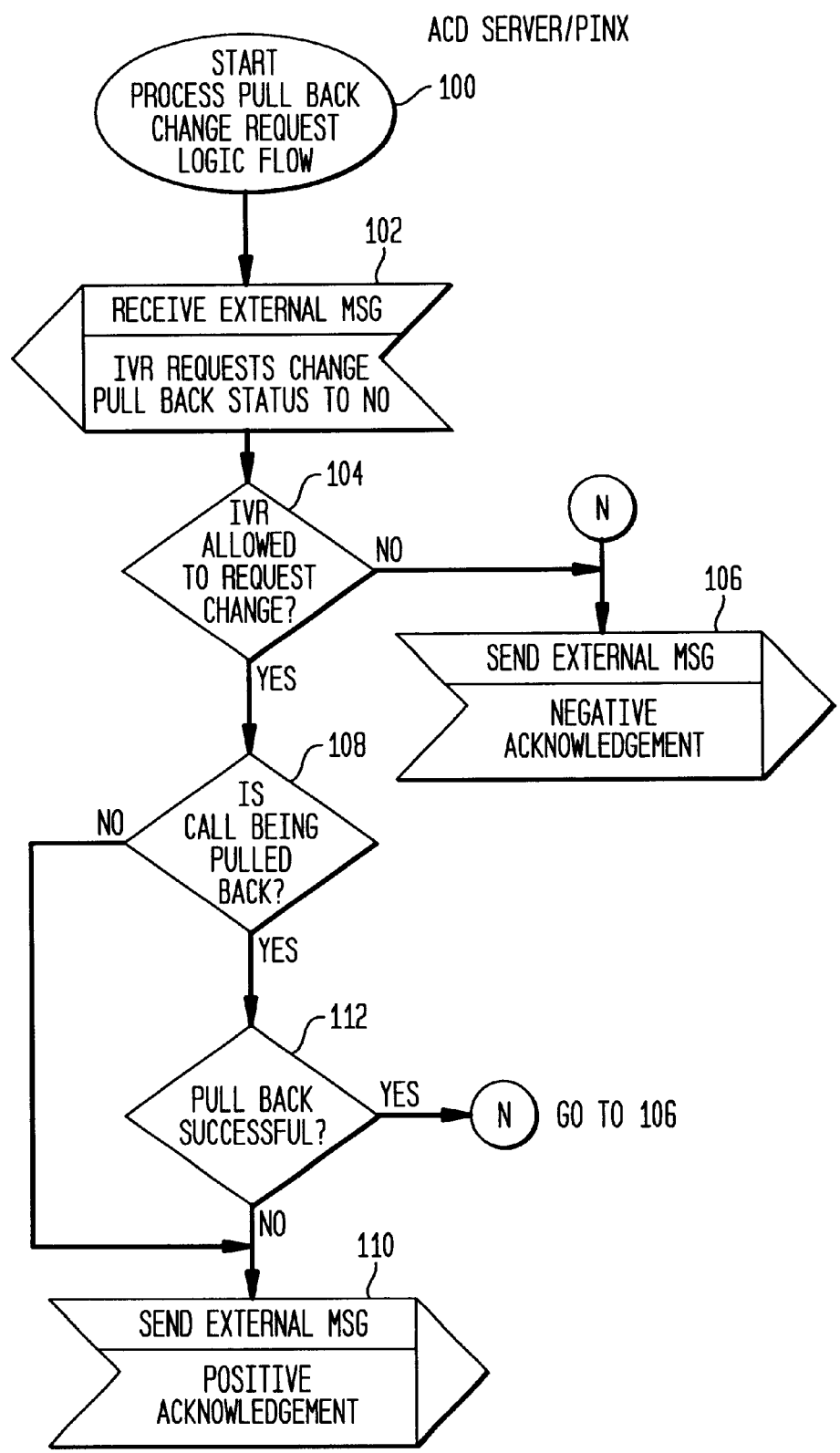
FIG. 4 is a high level flow chart illustrating the logic of processing a pull back status change request.

FIG. 4 shows in some detail the functions at the ACD server when processing a pull back status change request from the IVR server. The process starts at 100 and the message from the IVR server to change the pull back status is received at 102.

It is determined at 104 whether the IVR server has permission to request the change. If it does not have permission, a negative acknowledgement is sent at 106. If it does have permission, it is determined at 108 whether the call is in the process of being pulled back.

If the call is not in the process of being pulled back, the status is changed and a positive acknowledgement is sent to the IVR server at 110. If the call is in the process of being pulled back, it is determined at 112 whether pull back has been successful. If it was successful, a negative acknowledgement is sent at 106. If it was not successful, the status is changed and a positive acknowledgement is sent to the IVR server at 110.

FIG. 5 illustrates an exemplary format and binary encoding (7-bit encoding for 8-bit octet) for the call SETUP message from the ACD server to the IVR server and for the change pull back status message from the IVR server to the ACD server.

The example uses three octets, one octet for the Pullback Flag Status data, one octet for the Pullback Mode, and one octet for a service identifier.

The Pullback Flag Status (octet 1) represents the current Pullback setting (i.e., pullback allowed or not allowed) when received in a SETUP message. This flag is configured at call setup and indicates whether or not a call can be pulled away from the IVR server and rerouted independent of current processing.

When the Pullback Flag is received in a message from the IVR server to the ACD server, it represents the new Pullback setting being requested. This operation is unconfirmed when sent in the SETUP message and confirmed when sent in a FACILITY message to change status.

The Pullback Mode (octet 2) contains an indication of whether or not the Pullback setting can be changed. This information is only meaningful when transported in a SETUP message.

The Service Number (octet 3) contains an identifier of a service to which the IVR Selection Processor can connect the call. This information is only meaningful when transported in a SETUP message. A service number might be, for example, a particular voice script to be played. The service number values are implementation dependent and must be known to both the ACD server and IVR server.

The RESERVED encoding shown in FIG. 5 is used when an octet is to be ignored.

Figure 6:
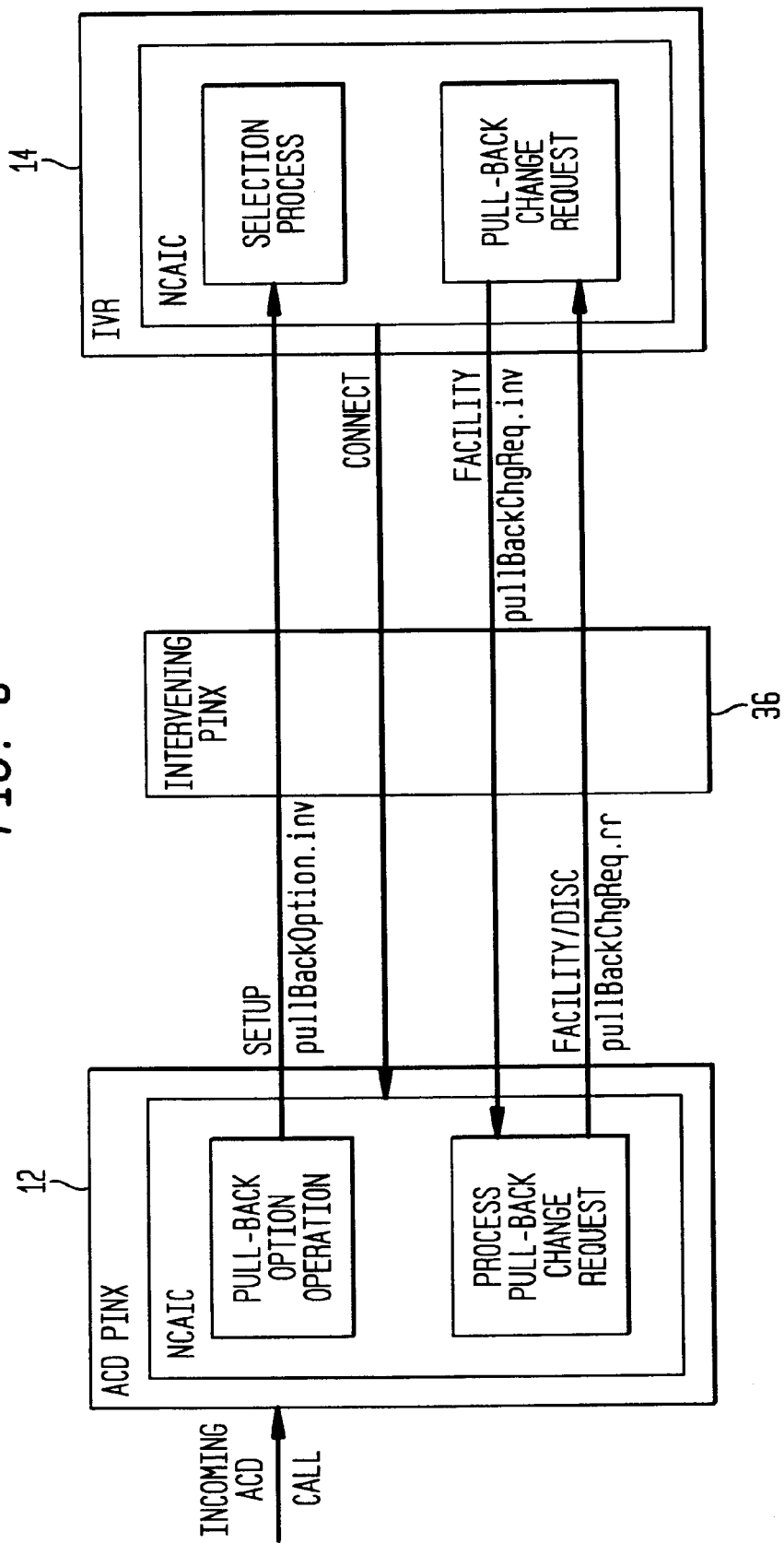
FIG. 6 is a high level block diagram illustrating message flow between an ACD and an IVR according to the invention.

FIG. 6 illustrates an example of ISDN signaling associated with an ACD call routed to an IVR with the signaling described above. The SETUP information is sent in the SETUP message from the ACD to the IVR in a Pull-Back-Option invocation (pullBackOption.inv) operation. The IVR responds with a CONNECT message. A request to change the pull back status is sent from the IVR to the ACD with a Pull-Back-Change-Request invocation (pullBackChgReq.inv) operation. The return result (e.g., rejection, acceptance) to the Pull-Back-Change-Request invocation may be sent in a FACILITY or Disconnect message, depending on status of the call (e.g., when pulling the call back at this time a Disconnect message is used).

When the ACD receives a Pull-Back-Change-Request invocation and changes the Pullback flag status from "pullback not allowed" to "pullback allowed", ACD must search all groups to which the caller is queued for an available agent.

If an agent is available, a Pullback attempt will be initiated. When the ACD changes the Pullback setting from "pullback allowed" to "pullback not allowed", the ACD will ignore any agents that become available in groups to which the caller is queued.

When the IVR requests the ACD to change the Pullback setting when the pull back mode does not permit such a change (i.e. Pullback Mode=cannot be changed), the IVR's request to change the Pullback status is rejected with a negative acknowledgement.

When the ACD receives a valid request by the IVR to change the Pullback setting to "not allowed" when a Pullback attempt is already in progress, the ACD must wait for the outcome of the Pullback attempt before sending a response to the IVR.

If the Pullback attempt fails, a positive acknowledgement indication will be sent to the IVR.

If the Pullback attempt succeeds, the ACD sends a negative acknowledgement indication to the IVR and processes the Pullback.

The successful Pullback completion will cause a disconnect message to be sent to the IVR from the calling party.

It is possible that the IVR can send a message to request the ACD to change the Pullback flag status and receive a disconnect message from the calling party before receiving an acknowledgement from ACD. This will occur when ACD completes a successful Pullback before ever processing the message from the IVR to change the Pullback setting.

There have been described and illustrated herein methods and apparatus for network control of ACD and IVR calls. While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as so claimed.

What is claimed is:

1. In a communications network including a first communications device and a second communications device, a method for controlling call handling, said method comprising the steps of:
    (a) determining a pull back status which indicates whether the first communications device is allowed to pull back a call, said determination of pull back status being based on a first call criterion;
    (b) determining a permission to change status which indicates whether the second communications device may request a change in the pull back status; and
    (c) notifying the second communications device of the pull back status and the permission to change status.

2. A method according to claim 1 wherein said first call criterion is selected from the group consisting of called number, calling number, time of day, day of week, and date.

3. A method according to claim 1 wherein said determination of permission to change status being based on a criterion selected from the group consisting of called number, calling number, time of day, day of week, and date.

4. A method according to claim 1 further comprising the steps of:
    (d) determining a service number which indicates which service the second communications device is to apply to the call, said determination of service number being based on a second call criterion; and
    (e) notifying the second communications device of the service number.

5. A method according to claim 4 wherein said second call criterion is selected from the group consisting of called number, calling number, time of day, day of week, and date.

6. A method according to claim 3 further comprising the steps of:
    (d) determining a service number which indicates which service the second communications device is to apply to the call, said determination of service number being based on a third call criterion; and
    (e) notifying the second communications device of the service number.

7. A method according to claim 6 wherein said third call criterion is selected from the group consisting of called number, calling number, time of day, day of week, and date.

8. A method according to claim 3 further comprising the steps of:
    (d) determining whether a requested transaction from the second communications device is critical; and
    (e) proceeding with the critical transaction if the pull back status indicates that the call cannot be pulled back.

9. A method according to claim 8 further comprising the steps of:
    (f) determining whether the permission to change status indicates that the second communications device may request a change in the pull back status; and
    (g) requesting a change in the pull back status before proceeding with a critical transaction if the pull back status indicates that the call can be pulled back and the permission to change status indicates that the second communications device may request a change in the pull back status.

10. A method according to claim 9 further comprising the step of presenting the call with the option of proceeding with a critical transaction which may be interrupted when the pull back status indicates that the call can be pulled back and the permission to change status indicates that the second communications device may not request a change in the pull back status.

11. A method according to claim 10 further comprising the step of presenting the call with the option of proceeding with a non-critical transaction which may be interrupted when the pull back status indicates that the call can be pulled back and the permission to change status indicates that the second communications device may not request a change in the pull back status.

12. A method according to claim 9 further comprising the step of denying a request to change the pull back status when pull back has already commenced and is successful.

13. A method according to claim 6 wherein the pull back status and the permission to change status are eight bit flags, and the service number is an eight bit indicator.

14. A method according to claim 9 wherein said step of requesting a change includes sending the requested pull back status from the second communications device to the first communications device.

15. A method according to claim 9 further comprising the step of acknowledging the requested change in pull back status.

16. An incoming call processing apparatus, comprising:
   (a) a first communications device having transaction processing means for processing simple transactions and critical transactions;
   (b) a second communications device coupled to said first communications device, said second communications device including means for transferring a call to said first communications device and means for pulling back a call from said first communications device;
   (c) status determining means for determining a pull back status which indicates whether said second communications device is allowed to pull back a call, the determination of pull back status being based on a first call criterion; and
   (d) permission determining means for determining a permission to change status which indicates whether the first communications device may request a change in the pull back status.

17. An apparatus according to claim 16 wherein said first call criterion is selected from the group consisting of called number, calling number, time of day, day of week, and date.

18. An apparatus according to claim 16 wherein the determination of permission to change status being based on a second call criterion.

19. An apparatus according to claim 18 wherein said second call criterion is selected from the group consisting of called number, calling number, time of day, day of week, and date.

20. An apparatus according to claim 16 further comprising service determining means for determining a service number which indicates which service the first communications device is to apply to the call, the determination of service number being based on a criterion selected from the group consisting of called number, calling number, time of day, day of week, and date.

21. An apparatus according to claim 19 further comprising service determining means for determining a service number which indicates which service the first communications device is to apply to the call, the determination of service number being based on a criterion selected from the group consisting of called number, calling number, time of day, day of week, and date.

22. An apparatus according to claim 19 further comprising critical determining means for determining whether a requested first communications device transaction is critical.

23. An apparatus according to claim 22 further comprising request means for requesting a change in the pull back status before proceeding with a critical transaction if the pull back status indicates that the call can be pulled back and the permission to change status indicates that the first communications device may request a change in the pull back status.

24. An apparatus according to claim 23 further comprising option means for presenting the call with the option of proceeding with a critical transaction which may be interrupted when the pull back status indicates that the call can be pulled back and the permission to change status indicates that the first communications device may not request a change in the pull back status.

25. An apparatus according to claim 24 further comprising option means for presenting the call with the option of proceeding with a non-critical transaction which may be interrupted when the pull back status indicates that the call can be pulled back and the permission to change status indicates that the first communications device may not request a change in the pull back status.

26. An apparatus according to claim 23 further comprising means for denying a request to change the pull back status when a pull back has already commenced and is successful.

27. An apparatus according to claim 23 further comprising means for acknowledging a requested change in pull back status.

28. A method for allowing a caller to complete a critical transaction without interruption by a first communications device while connected to a second communications device, said method comprising the steps of:
   (a) determining whether the first communications device can interrupt a transaction with the second communications device, said determination being based on a first call criterion;
   (b) determining whether the second communications device is allowed to request the first communications device not to interrupt a transaction; and
   (c) notifying the second communications device whether the first communications device can interrupt a transaction and whether the second communications device is allowed to request the first communications device not to interrupt a transaction.

29. A method according to claim 28 wherein said first call criterion is selected from the group consisting of called number, calling number, time of day, day of week, and date.

30. A method according to claim 28 wherein said determination of whether the second communications device is allowed to request the first communications device not to interrupt a transaction is based on a second call criterion.

31. A method according to claim 30 wherein said second call criterion is selected from the group consisting of called number, calling number, time of day, day of week, and date.

32. A method according to claim 30 further comprising the steps of:
   (d) determining, based on a third call criterion, a service number which indicates which service the second communications device is to apply to the call; and
   (e) notifying the second communications device of the service number.

33. A method according to claim 32 wherein said third call criterion is selected from the group consisting of called number, calling number, time of day, day of week, and date.

34. A method according to claim 28, further comprising the steps of:
   (d) determining whether a requested transaction from the second communications device is critical; and
   (e) proceeding with a critical transaction if the first communications device cannot interrupt the transaction.

35. A method according to claim 30 further comprising the steps of:
   (d) determining whether a requested transaction from the second communications device is critical; and
   (e) if the first communications device can interrupt the transaction, requesting that it not interrupt the transaction before proceeding with the critical transaction.

36. A method according to claim 30 further comprising the steps of:
   (d) determining whether a requested transaction from the second communications device is critical; and (e) if the first communications device can interrupt the transaction, presenting the call with the option of proceeding with a critical transaction which may be interrupted.

37. A method according to claim 35, further comprising the step of denying the request if the second communications device is not allowed to make the request.

38. An apparatus for allowing a caller to complete a critical transaction without interruption by a first communications device while connected to a second communications device, said apparatus comprising:
   (a) first determining means for determining whether the first communications device can interrupt a transaction with the second communications device, said determination being based on a first call criterion;
   (b) second determining means for determining whether the second communications device is allowed to request the first communications device not to interrupt a transaction based on a second call criterion; and
   (c) means for notifying the second communications device whether the first communications device can interrupt a transaction and if the second communications device is permitted to request the first communications device not to interrupt a transaction.

39. An apparatus according to claim 38 wherein said first call criterion is selected from the group consisting of called number, calling number, time of day, day of week, and date.

40. An apparatus according to claim 38 wherein said means for determining whether the second communications device is allowed to request the first communications device not to interrupt a transaction is based on a second call criterion.

41. An apparatus according to claim 40 wherein said second call criterion is selected from the group consisting of called number, calling number, time of day, day of week, and date.

42. An apparatus according to claim 40 further comprising:
   (d) third determining means for determining, based on a third call criterion, a service number which indicates which service the second communications device is to apply to the call; and
   (e) means for notifying the second communications device of the service number.

43. An apparatus according to claim 42 wherein said third call criterion is selected from the group consisting of called number, calling number, time of day, day of week, and date.

44. An apparatus according to claim 38 further comprising means for determining whether a requested transaction from the second communications device is critical.

45. An apparatus according to claim 40 further comprising:
   (d) means for determining whether a requested transaction from the second communications device is critical; and
   (e) means for requesting that the first communications device not interrupt the transaction before proceeding with the critical transaction.

46. An apparatus according to claim 40 further comprising:
   (d) means for determining whether a requested transaction from the second communications device is critical; and
   (e) means for presenting the call with the option of proceeding with a critical transaction which may be interrupted.

47. An apparatus according to claim 45 further comprising means for denying the request if the second communications device is not allowed to make the request.

48. A signaling protocol for call handling by a first communications device and a second communications device, said protocol comprising the steps of:
   (a) determining, based on a first call criterion, a pull back status which indicates whether the first communications device has the ability to pull back a call from the second communications device;
   (b) determining, based on a second call criterion, a permission to change status which indicates whether the second communications device may request a change in the pull back status, and
   (c) notifying the second communications device of the pull back status and the permission to change status.

49. A protocol according to claim 48 wherein said first call criterion is selected from the group consisting of called number, calling number, time of day, day of week, and date.

50. A protocol according to claim 48 wherein said determining of a permission to change status is based on a second call criterion.

51. A protocol according to claim 50 wherein said second call criterion is selected from the group consisting of called number, calling number, time of day, day of week, and date.

52. A protocol according to claim 50 further comprising the steps of:
   (d) determining a service number which indicates which service the second communications device is to apply to the call, said determination of service number being based on a third call criterion; and
   (e) notifying the second communications device of the service number.

53. A protocol according to claim 52 wherein said second call criterion is selected from the group consisting of called number, calling number, time of day, day of week, and date.

54. A protocol according to claim 53 further comprising the steps of:
   (f) determining whether a requested transaction for the second communications device is critical; and
   (g) proceeding with a critical transaction if the pull back status indicates that the call cannot be pulled back.

55. A protocol according to claim 54 further comprising the steps of:
   (h) determining whether the permission to change status indicates that the second communications device may request a change in the pull back status; and
   (i) requesting a change in the pull back status before proceeding with a critical transaction if the pull back status indicates that the call can be pulled back and the permission to change status indicates that the second communications device may request a change in the pull back status.

56. A protocol according to claim 55 further comprising the step of presenting the call with the option of proceeding with a critical transaction which may be interrupted when the pull back status indicates that the call can be pulled back and the permission to change status indicates that the second communications device may not request a change in the pull back status.

57. A protocol according to claim 55 further comprising denying a request to change the pull back status when pull back has already commenced and is successful.

58. A protocol according to claim 55 further comprising acknowledging the requested change in pull back status.

59. A method for processing an incoming call in a communications network having a first communications device and a second communications device, said method comprising the steps of:

(a) the first communications device signaling initial call control information to the second communications device;
(b) the first communications device signaling to the second communications device whether said second communications device has permission to request a change in the call control information; and
(c) the second communications device signaling a request to change call control information to the first communications device.

60. A method according to claim 59 wherein said initial call control information includes an indication of whether the first communications device is permitted to pull back the call from the second communications device.

61. A method according to claim 60 wherein said initial call control information includes a service request.

62. A method according to claim 61 further comprising the step of said second communications device applying a service to the call based on the service request.

* * * * *